US010565385B1

(12) United States Patent
Ravi et al.

(10) Patent No.: US 10,565,385 B1
(45) Date of Patent: Feb. 18, 2020

(54) SUBSTITUTE WEB CONTENT GENERATION FOR DETECTION AND AVOIDANCE OF AUTOMATED AGENT INTERACTION

(71) Applicant: Amazon Technologies, Inc., Seattle, WA (US)

(72) Inventors: Lohith Ravi, Kirkland, WA (US); Archiman Dutta, Shoreline, WA (US)

(73) Assignee: Amazon Technologies, Inc., Seattle, WA (US)

(*) Notice: Subject to any disclaimer, the term of this patent is extended or adjusted under 35 U.S.C. 154(b) by 116 days.

(21) Appl. No.: 15/688,772

(22) Filed: Aug. 28, 2017

(51) Int. Cl.
*G06F 21/60* (2013.01)
*H04L 29/06* (2006.01)
*G06F 21/56* (2013.01)
*G06F 21/55* (2013.01)

(52) U.S. Cl.
CPC ........... *G06F 21/60* (2013.01); *G06F 21/552* (2013.01); *G06F 21/566* (2013.01); *H04L 63/1425* (2013.01)

(58) Field of Classification Search
CPC ..................................................... G06F 21/60
See application file for complete search history.

(56) References Cited

U.S. PATENT DOCUMENTS

| 7,680,891 | B1* | 3/2010 | Pongsajapan | G06Q 10/107 |
| | | | | 709/206 |
| 8,397,275 | B1* | 3/2013 | Magdsick | G06F 21/31 |
| | | | | 380/200 |
| 8,671,058 | B1* | 3/2014 | Isaacs | G06F 21/36 |
| | | | | 382/100 |
| 9,495,532 | B1* | 11/2016 | Zhurkin | G06F 21/36 |
| 9,600,678 | B1* | 3/2017 | Alamuri | G06F 21/62 |
| 2006/0287963 | A1* | 12/2006 | Steeves | G06Q 20/367 |
| | | | | 705/64 |
| 2007/0201745 | A1* | 8/2007 | Wang | G06K 9/00 |
| | | | | 382/181 |

(Continued)

OTHER PUBLICATIONS

Tan et al.; Phishing website detection using URL-assisted brand name weighting system; Published in: 2014 International Symposium on Intelligent Signal Processing and Communication Systems (ISPACS); Date of Conference: Dec. 1-4, 2014; IEEE Xplore (Year: 2014).*

(Continued)

*Primary Examiner* — Bradley W Holder
(74) *Attorney, Agent, or Firm* — Davis Wright Tremaine LLP

(57) ABSTRACT

Online service providers may operate a rendering service for generating and providing substitute web content information for rendering substitute web content instead of authentic web content. The rendering service may obtain web content information for the authentic web content in response to receiving a request for web content. The rendering service may use the web content information to generate the substitute web content information. The substitute web content information is useable by the computing device to generate substitute web content that includes one or more visual elements resembling resource objects of the authentic web content. The visual elements are rendered, as a result of processing by the computing device, as image content instead of interactive objects.

20 Claims, 11 Drawing Sheets

(56) References Cited

U.S. PATENT DOCUMENTS

| | | | |
|---|---|---|---|
| 2009/0210937 A1* | 8/2009 | Kraft | G06Q 30/02 726/17 |
| 2009/0328150 A1* | 12/2009 | Gross | A63F 13/12 726/3 |
| 2011/0208716 A1* | 8/2011 | Liu | G06F 21/36 707/710 |
| 2011/0296509 A1* | 12/2011 | Todorov | G06F 21/36 726/7 |
| 2012/0195517 A1* | 8/2012 | Mittur | G06F 21/31 382/254 |
| 2012/0222100 A1* | 8/2012 | Fisk | G06F 21/316 726/7 |
| 2012/0323700 A1* | 12/2012 | Aleksandrovich | G06F 21/36 705/14.69 |
| 2013/0019278 A1* | 1/2013 | Sun | G06F 21/36 726/2 |
| 2013/0031640 A1* | 1/2013 | Fisk | G06F 21/36 726/28 |
| 2014/0196133 A1* | 7/2014 | Shuster | H04L 63/126 726/7 |
| 2014/0250538 A1* | 9/2014 | Rapaport | G06F 21/31 726/28 |
| 2015/0365401 A1* | 12/2015 | Brown | H04L 63/0838 726/7 |
| 2016/0048662 A1* | 2/2016 | Arnoud | G06F 21/31 726/5 |
| 2016/0055329 A1* | 2/2016 | Akula | G06F 21/36 726/7 |
| 2016/0188850 A1* | 6/2016 | Limbasia | G06F 21/31 726/7 |
| 2017/0048235 A1* | 2/2017 | Lohe | G06Q 20/065 |
| 2017/0180348 A1* | 6/2017 | Piccolotto | G06K 9/00906 |
| 2018/0063107 A1* | 3/2018 | Gonen | H04L 63/08 |
| 2018/0189471 A1* | 7/2018 | Paluri | G06F 21/36 |
| 2018/0341779 A1* | 11/2018 | Sawant | H04N 21/00 |
| 2019/0057206 A1* | 2/2019 | Deng | G06F 21/36 |

OTHER PUBLICATIONS

Agarwal et al.; Blocking objectionable web content by leveraging multiple information sources; Published in: Newsletter ACM SIGKDD Explorations Newsletter Homepage archive; vol. 8 Issue 1, Jun. 2006; pp. 17-26; ACM Digital Library (Year: 2006).*

\* cited by examiner

SUBSTITUTE WEB CONTENT GENERATION FOR DETECTION AND AVOIDANCE OF AUTOMATED AGENT INTERACTION

BACKGROUND

Modern websites are complex structures comprising large volumes of webpages to fulfill the needs of their customers. Automated agents (e.g., bots) may systematically access content from many, if not all, available webpages of the website in a methodical manner to download or index the website content. Such processes are commonly known as "web crawling" or "web scraping". Detecting these automated agents is a complex problem. Some solutions have implemented computer automated public touring tests ("CAPTCHAs") to prevent automated agents from accessing web pages and to detect automated agent activity. However, in some instances, it may be undesirable to implement CAPTCHAs. For example, in electronic commerce applications, implementing CAPTCHAs for each page may annoy or aggravate consumers, causing them to leave a webpage or website. Moreover, some technologies developed may aid automated agents to solve CAPTCHAs. There is a need for a solution for preventing unfettered access of automated agents to crawl or scrape websites without adversely affecting user interactions with website content.

BRIEF DESCRIPTION OF THE DRAWINGS

Various techniques will be described with reference to the drawings, in which.

DETAILED DESCRIPTION

Figure 1:
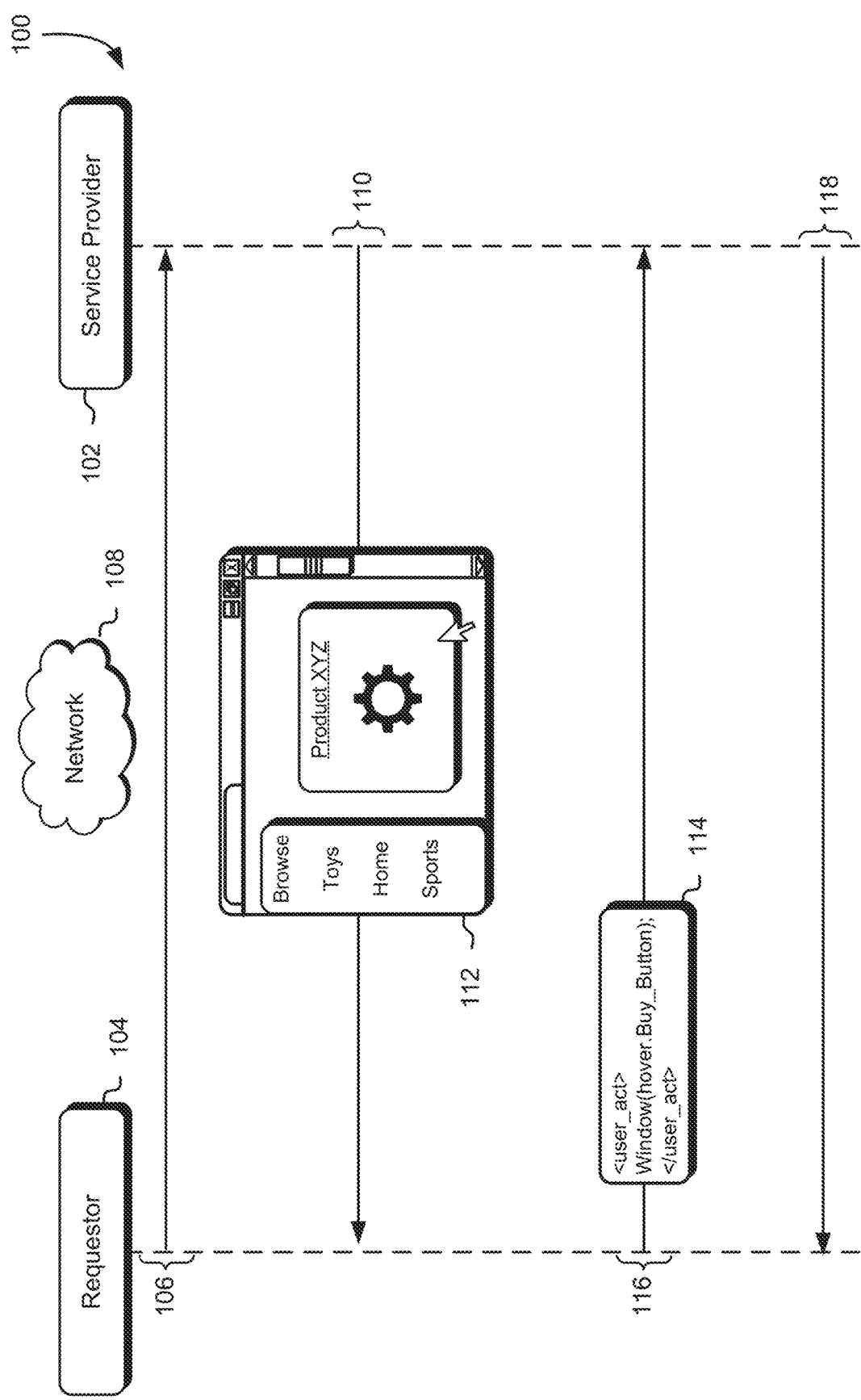
FIG. 1 illustrates a communication diagram showing communications for providing substitute web content to a requestor.

Techniques described and suggested herein relate to the provisioning of substitute web content for detecting automated agents and determining whether to prevent, deter, reroute or the automated agents from accessing web content provided by a provider computing system associated with a website in which interaction with the web content by the automated agent is undesirable. In an embodiment, the provider computing system comprises one or more servers for interacting with human users to provide online content. Although the techniques described herein are described with respect to an online retailer from which users may purchase goods and services, the techniques are generally applicable to any website capable of receiving communications for automated agents. An automated agent, as describe herein, is an autonomous entity or application executing on a collection of computing resources that is programmed to systematically and autonomously generate information based on the submission of requests submitted to the provider computer system to access web content and receive responses from the provider computing system.

The provider computing system may be configured to receive a request from a user to access web content, such as a webpage. A rendering service of the provider computing system may, in response to the provider computing system receiving the request, obtain content information from the content service of the provider computing system. The content information may correspond to authentic web content information for the web content requested. The authentic web content information may include interactive data objects, such as buttons or uniform resource locators that an automated agent may interact with to obtain or generate data regarding the website. The rendering service may use the content information obtained to generate substitute web content information configured to, upon processing by a web browser or application on a computing device of the requesting user, render substitute web content that has visual content appearing identical to or resembling data objects of the authentic web content. The visual content of the substitute web content may include one or more visual elements that an automated agent would not interpret as being non-interactive visual data objects (e.g., JPEG images). For example, the visual elements may be images copying the appearance of the interactive data objects of the authentic web content.

The substitute web content information, upon rendering by the user computing device, may include a plurality of web content layers. One web content layer may be a presentation layer or image layer comprising the non-interactive visual content and/or visual elements appearing identical to the interactive data objects of the authentic web content. Another web content layer may be an interaction detection layer or data exchange layer configured to detect user interactions associated with the non-interactive visual content. The substitute web content rendered may be configured to, in response to detection of user interaction by the interaction detection layer, provide interaction information to the rendering service. The interaction information may characterize the user interaction(s) detected, such as by indicating content of the user interaction (e.g., left mouse click). The interaction information may include position information characterizing a position of the user interaction relative to the substitute web content rendered (e.g., XY coordinate position of a cursor within a browser). In response receiving the interaction information, the rendering service may provide additional information to the user computing device usable to generate a response to the user interaction detected. For instance, the additional information may include information for rendering an image or animation for presenting a drop-down menu in response to detecting user interaction with the radio selection object depicted by a visual element in the substitute web content rendered.

The provider computing system may include a bot detection service for analyzing information regarding user interactions and generating assessment information indicating a confidence of whether a user is associated with automated agent activity. The rendering service may provide information regarding the interaction information received from the user computing device to the bot detection service, which the bot detection service may analyze to provide an indication of automated agent activity in association with the user. The bot detection service may provide the rendering service with an indication of whether the user is associated with automated agent activity. For instance, the rendering service may generate the substitute web content information in response to receiving an indication that the user has been previously determined to exhibit behavior consistent with an automated agent. Conversely, the rendering service may generate authentic web content in response to receiving an indication that the user has been previously determined to exhibit behavior consistent with a human user.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 is an illustrative example of a communication diagram 100 in which various computing resources may communicate for the provisioning of website content according to various embodiments of the present disclosure. One or more computing devices of a computing resource service provider 102 receive, from a requestor 104, a request 106 for web content. The web content requested may be for a webpage or document designed to be rendered on a certain program (e.g., platform, application, or browser) running on the requestor's 104 computing device. Service providers may include website operators, online retailers, social network providers, cable providers, online game providers or any entity capable of receiving automated agent traffic. The requestor 104 may connect with the service provider through a computer system client device and may initiate connection with and/or interaction with one or more applications running on an interfacing service of the service provider 102. The requestor 104 may also connect to the service provider 102 through the computer system client device and may initiate connection with and/or interaction with one or more applications running on the interfacing service of the service provider 102. The service provider 102 may provide a multitude of services, such as an electronic marketplace offering goods and services for purchase and/or consumption by customers of the service provider 102, or a website hosting service through which users can design and/or host websites for interacting with their customers. The command or commands to connect to the service provider 102 may originate from an outside computer system and/or server, or may originate from an entity, user or process on a remote network location, or may originate from an entity, user or process within the computing resource service provider, or may originate from a user of the computer system client device, or may originate as a result of an automatic process or may originate as a result of a combination of these and/or other such origin entities. In some embodiments, the command or commands to initiate the connection to the service provider 102 may be sent, without the intervention of the requestor 104. For example, an automated agent or "bot" may attempt to connect to the service provider 102 through computer system client device.

The requestor 104 may submit the request 106 to the service provider 102 via one or more connections and, in some embodiments, via one or more networks and/or entities associated therewith, such as servers connected to the network, either directly or indirectly. The computer system client device that may request access to the service provider 102 may include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, and/or a distributed computing system with a plurality of network nodes, and/or the like. The network may also operate in accordance with various protocols, such as those listed below, Bluetooth, Wi-Fi, cellular network protocols, satellite network protocols, and/or others.

The request 106 may be transmitted by a computing system or device (e.g., personal computer, tablet computer, mobile device) of the requestor 104 over a network 108, as described above. The request 106 may be provided as a result of a human interacting with an input device of the computing device, or may be provided as a result of an action executed by an automated agent or "bot", as described herein. The user computing system or device may generate and/or transmit the request 106 using a web browser or other application executing on the computing system or device. The request 106 may be formatted according to an appropriate communication protocol, such as Hypertext Transfer Protocol ("HTTP"). The request 106 may include information identifying the web content requested, and may include additional information such as information regarding the user, such as user account or profile information, location, host address, application or browser being used by the requestor computing device, and the like.

The service provider 102 may obtain web content information for the content requested and provide a response 110 for fulfilling the request 106. In one embodiment, wherein the web content requested is a webpage, the web content information may be webpage content information for rendering and/or processing the webpage on a web browser or other appropriate application. The response 110 may be provided to the requestor 104 in a similar manner as the request 106. For instance, the response 110 may be provided over the network 108 and may be formatted according to the same or similar protocol as the request 106. The service provider 102 may generate a content file 112 to be included in the response 110. The content file 112 may, upon processing by an appropriate application or browser on the requestor computing device, cause a substitute webpage to be rendered that resembles or is identical to the webpage requested in appearance and/or behavior, as described below in greater detail. The content file 112 may be a webpage file provided as a Hypertext Markup Language ("HTML") file that the application or browser on the requestor computing device may process to render the substitute webpage for viewing and interaction by the requestor 104.

The content file 112 may include information that cause the application or browser rendering the substitute webpage to detect a user interaction and generate user interaction information 114 characterizing user interactions with the substitute webpage rendered. For instance, the interaction information 114 may include information specifying or describing input received from an input device of a user, such as a location of the user's mouse cursor on the screen, movement of the user's mouse, a left or right-click of the user's mouse, text input, and so forth. The content file 112 may cause the computing device running the application or browser to process the interaction information 114 and generate an appropriate response. In one instance, the content file 112 may cause the application or web browser to generate an output to the user as the response, such as by displaying additional information, rendering an animation, or producing a sound. In one instance, the application or web browser executing the content file 112 may cause, in response to processing the interaction information 114, perform an action specified in the content file 112. For instance, the application or web browser may send a communication 116 to the service provider 102. The communication 116 may include the interaction information 114 itself or may include a result generated based on the interaction information 114. In one instance, for example, a user clicking on a "buy" button displayed on the page rendered may cause the application or browser to send a communication 116 including a request to process the "buy" button click. The service provider 102 may process the communication 116 and information contained therein, and then generate and send an additional information 118 to the requestor 104. The additional information 118 may modify or supplement the interaction information 114 to cause the application or browser to provide or render an appropriate response to the interaction information 114. In one embodiment, the content file 112 may be programmed to receive the additional information 118 prior to causing a response to the interaction information 114 to be generated or rendered.

Figure 2:
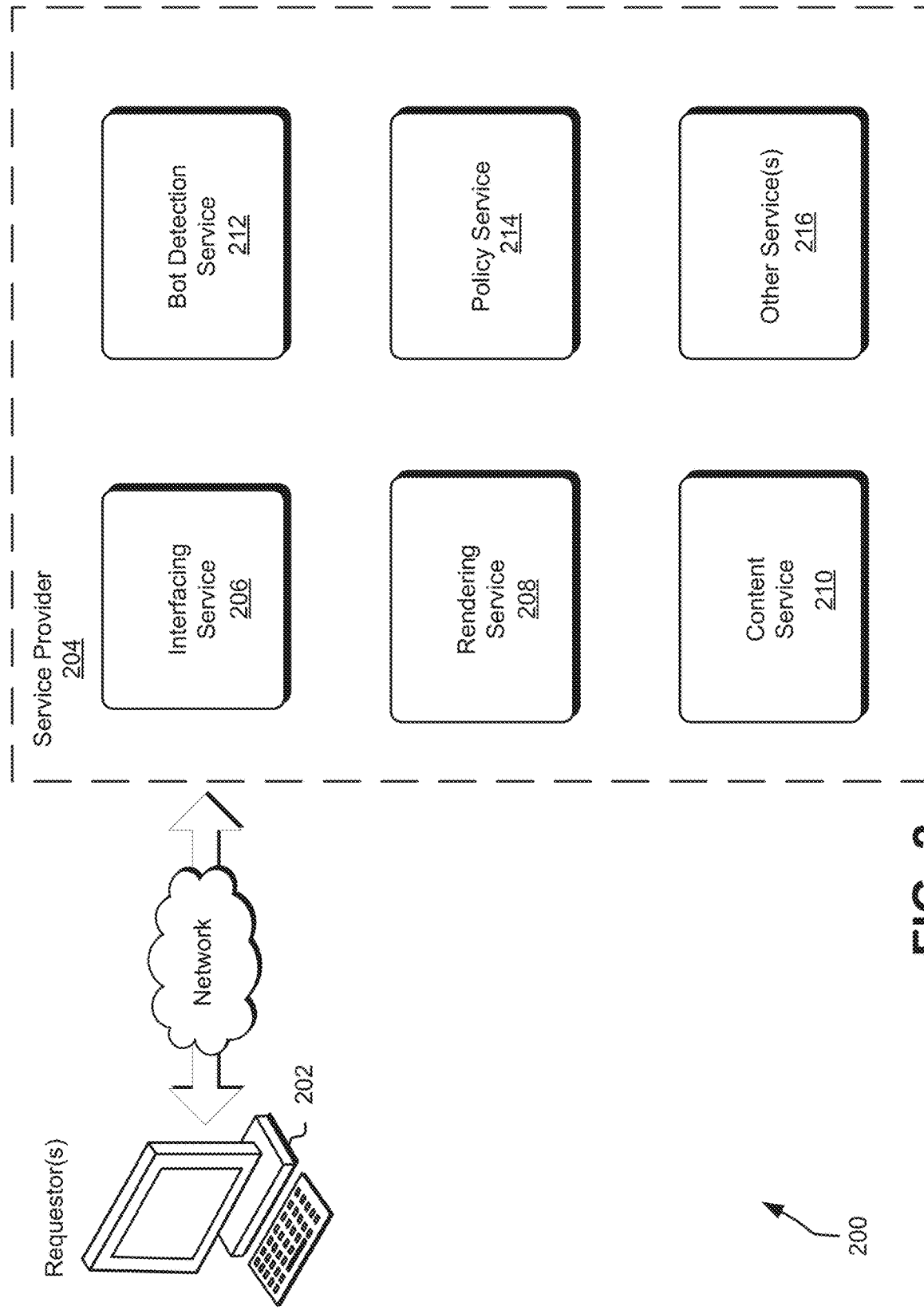
FIG. 2 illustrates an environment showing a service provider in accordance with various aspects of the present disclosure.

FIG. 2 is an illustrative example of an environment 200 in which requestor(s) 202 may interact with a service provider 204. The requestor(s) 202 may be automated agents or humans. The service provider 204 may operate a website that provides an online marketplace where requestors 202 may purchase and offer for sale various goods and services; however, the service provider 204 may provide one or more other services to which systems and methods disclosed herein are applicable. The service provider 204 may comprise or provide one or more services depicted, including an interfacing service 206, a rendering service 208, a content service 210, a bot detection service 212, a policy service 214, and one or more other service(s) 216. The services may each be executable programming code running or executing on one or more computing devices or resources (e.g., servers, personal computers, virtual machines) of or for the service provider 204. Although the services herein are described as being separate services, those of skill in the art will appreciate that two or more of the services may be implemented to operate as a single service of the service provider 204.

The requestor(s) 202 may transmit requests to access various resources of the service provider 204—for example, requestor(s) 202 may, using a computing device executing a web browser, navigate the website of the service provider 204 searching for a particular item. The computing device(s) associated with the requestor(s) 202 may transmit one or more HTTP requests to the interfacing service 206 of the service provider 204. The interfacing service 206 may be a collection of computing resources collectively configured to receive requests (e.g., HTTP requests) and interface with other services of the online retailer to fulfill the requests. For example, the interfacing service 206 may be a collection of computer systems (e.g., servers) located on an online retail network configured to direct incoming and outgoing traffic based at least in part on requests included in the incoming traffic.

The interfacing service 206 may direct requests using HTTP redirect or other routing techniques. The interfacing service 206 may be responsible for directing requests to the appropriate service of the service provider 204 for processing. Requests for web content (e.g., webpages) received may be directed to the rendering service 208 for fulfillment. The rendering service 208 may be a collection of computing resources collectively configured to receive web content requests, obtain web content information, and process the web content information to generate substitute web content that, when rendered or processed by a requestor computing device, would generate a substitute digital document or substitute webpage having a visual appearance that resembles or is identical to an appearance of the webpage requested. The rendering service may be a distributed system comprising one or more servers for rendering and distributing web content information to requestors. The one or more servers may generate web content information and distribute the web content information to the requestors. As described herein, the web content information may, upon execution by a browser or application, cause operations to be performed that are hidden from view by the user. The operations may be performed by a hidden engine or layer in the application or browser that acts as an intermediary between the server and the browser for processing web content information and user interactions while decreasing or minimizing latency. The engine is an intermediary layer that allows the user to asynchronously interact with the browser or application without waiting for communications to and from the server. The engine may be implemented a hidden browser or application component that operates on the user computing device to load or process content in the background out of view of the user, and/or asynchronously communicate with the one or more servers of the rendering service without detection or being visible to the user (e.g., by a process hidden or running in the background).

The substitute content may also cause the requestor computing device to have behavior resembling or identical to the behavior of the webpage requested such that a user interaction with visual objects on the substitute webpage would produce the same result as user interaction with corresponding visual objects on the requested webpage. The substitute web content generated may be in a format in accordance with a format specified in the request, such as a proprietary format used by a proprietary application, or with one or more formats used to for presentation on web pages, such as HTML, DHTML, Javascript, or CSS. The rendering service 208 may submit, to the content service 210, a request to provide information regarding content of the web content requested, and the request may include information identifying the web content requested. After receiving the requested content information from the content service 210, the rendering service 208 may process web content information received into substitute web content information, as described below in greater detail. The rendering service 208 may then provide the substitute web content information to the interfacing service 206 for fulfillment of the request received from the requestor(s) 202.

The content service 210 may be a collection of computing resources collectively configured to obtain web content information and provide the web content information to a requesting entity, such as the rendering service 208. The content service 210 may access data storage, such as memory or a database, containing web content information for presenting web content, such as a webpage, to a user. The web content information may be provided as one or more files, and may include HTML, DHTML, JavaScript®, Cascading Style Sheets ("CSS"), executable instructions, commands or other information suitable for causing the presentation of the requested web content in response to appropriate processing of the web content information.

The web content information obtained and provided by the content service 210 to the rendering service 208 may be authentic or original web content that, upon rendering by a browser or appropriate application of a computing device, would cause the authentic version of the web content or webpage to be presented. For example, the web content information of the content service 210 corresponds to authentic HTML web content document comprising HTML code developed and maintained for presentation to authorized users or human users for web browsing. The content service 210 may store or obtain secondary information associated with the web content requested that is used to determine whether to render the authentic web content with the substitute web content. The secondary information may indicate whether authentic content of the webpage should be rendered or whether substitute web content should be rendered. The secondary information may indicate subcontent on the webpage that should be rendered as authentic web content while other subcontent should be rendered as substitute web content. Subcontent is content of a webpage or web content that corresponds to a set of data objects on a webpage that comprises less than the entire webpage. As one example, the associated secondary information may specify some data objects on the webpage, such as buttons or hyperlinks, to be rendered in association with the webpage that should be rendered as substitute web content and specify other data objects that should be rendered as authentic web content. The secondary information may include other information, such as a behavior to be performed in association with automated agent activity—for example, specifying one or more data objects that should be rendered as substitute web content when automated agent activity is associated with the requestor. The secondary information may identify entire webpages that should be rendered as substitute content, or may identify subcontent therein that should be rendered as substitute content.

In one embodiment, the associated secondary information may include information characterizing a status of the web content or subcontent that the rendering service may use to determine whether to render the web content or subcontent as authentic or substitute content. The status information may be priority protection status information indicating content that should be protected from being compromised or accessed by an automated agent, such as a web crawler.

The status information may be an indication, such as a numeric value or parameter, that the rendering service 208 should protect the web content or subcontent to prevent access thereto by an automated agent or suspected automated agent. The rendering service 208 may determine whether to render the web content or subcontent as authentic or substitute using the secondary information in conjunction with information provided from other services, such as bot detection information provided by the bot detection service 212. The secondary information may be stored in data storage accessible by the content service 210 in association with the web content itself. The web content may be organized according to a structure or organization in which some nodes (e.g., webpages, webpage subcontent) in the data structure are identified as being important to protect against automated agent activity whereas other nodes do not necessarily need to be protected against automated agent activity.

The content service 210 may interact with other services than the rendering service 208, such as the policy service 214. For instance, the content service 210 may obtain policy information from policy service 214 indicating a policy for the requested web content information. The policy information may indicate whether the requestor 202 is authorized to receive the requested web content, or portions thereof. The policy information may indicate, for example, that the requestor 202 is not authorized to view specific content information (e.g., video information, audio information) included in the requested web content.

The bot detection service 212 may be a collection of computing resources collectively configured to determine a probability of whether the requestor 202 is an automated agent rather than a human user. In one aspect, the bot detection service 212 may obtain information identifying the requestor 202, such as profile information, user account information (e.g., username), host address, IP address, digital signature information, or location information (e.g., geographic location of the requestor 202), or other information useable to characterize or identify the requestor 202. The bot detection service 212 may access data storage storing information indicating a status or score associated whether the identification information for the requestor 202. The status may characterize whether the identification information is associated with activity indicative of automated agent traffic, associated with activity indicative of human user traffic, or has no previous associations. In other words, the status may indicate that there is a high confidence or low confidence that information associated with the requestor 202, such as previous activity information regarding behavior of the requestor 202, indicates that the requestor 202 is an automated agent. In another aspect, the bot detection service 212 may analyze traffic information received for the requestor 202 to generate status or confidence information regarding likelihood that the requestor 202 is an automated agent.

The bot detection service 212 may obtain behavior information, such as the interaction information described herein (e.g., interaction information 114 of FIG. 1), regarding behavior of the requestor 202, and analyze the behavior information to determine the status or confidence of bot activity associated with the requestor 202. For instance, the bot detection service 212 may determine an elevated confidence that the requestor 202 is an automated agent based at least in part on information obtained indicating that the requestor 202 failed to interact with a substitute webpage generated according to substitute webpage information provided by the rendering service 208. As described below, such behavior may indicate that the requestor 202 is an automated agent that does not recognize the substitute webpage. Alternatively, the bot detection service 212 may determine an elevated confidence that the requestor 202 is an automated agent based at least in part on information obtained indicating that the requestor 202 exhibited behavior inconsistent with a human user, such as by generating many inputs to the substitute webpage in a short period of time, interacting with one or more areas of the substitute webpage that do not have input objects associated with the one or more areas, or navigating away from one or more substitute webpages without appropriately interacting therewith.

The bot detection service 212 may provide the status or confidence information to other services. The bot detection service 212 may provide the confidence information to the rendering service 208 for use and responding to a request from the requestor 202. If the confidence information provided to the rendering service 208 indicates an elevated confidence that the requestor 202 is an automated agent or a low confidence that the requestor 202 is a human user, the rendering service 208 may provide substitute web content information to the requestor 202 By contrast, the rendering service may provide the authentic web content information instead of substitute web content information if the confidence information indicates a low confidence that the requestor 202 was an automated agent or high confidence that the requestor is a human user. In one embodiment, the bot detection service 212 may provide the confidence information to the policy service 214 or the content service 210 for determining what content information to provide. If the bot detection service 212 provides to the content service 210 confidence information indicating a high confidence that the requestor 202 is an automated agent (or a low confidence that the requestor 202 is a human user), for example, the content service 210 may decline to provide the requested content to the rendering service 208, or may provide different content than what was requested by the requestor 202, such as a HyperText Transfer Protocol (HTTP) 404 error.

The policy service 214 may be a collection of computing resources collectively configured to determine content but should be provided to the requestor 202 based at least in part on confidence information received by the bot detection service 212. If the bot detection service 212 provides to the policy service 214 confidence information indicating a high confidence that the requestor 202 is an automated agent, the policy service 214 may update policy information reflecting the determination by the bot detection service 212 (i.e., a high confidence that the requestor 202 is an automated agent). Thereafter, policy information provided by the policy service 214 to the content service 210 or the rendering service 208 may indicate that certain security precautions should be implemented in connection with the requestor 202, such as by providing substitute web content information instead of authentic web content information, as described herein, or by reducing the scope of or denying services provided by the service provider 204. The policy service 214 may be configured to automatically update policy information based on a change in confidence information or status provided by the bot detection service 212.

Other services 216 may also be provided by the service provider 204 in connection with the services described above. The other services may include cryptographic services, computing capacity services (e.g., a virtual machine provision services), authentication services, data storage services. In one embodiment, the rendering service 208 may render content provided by the other services 216 to mitigate or remediate vulnerabilities associated with providing an automated agent access to content provided by the other services 216. As described above, the other services 216 may be collections of computing resources configured to operate according to the respective functions or objectives.

Figure 3:
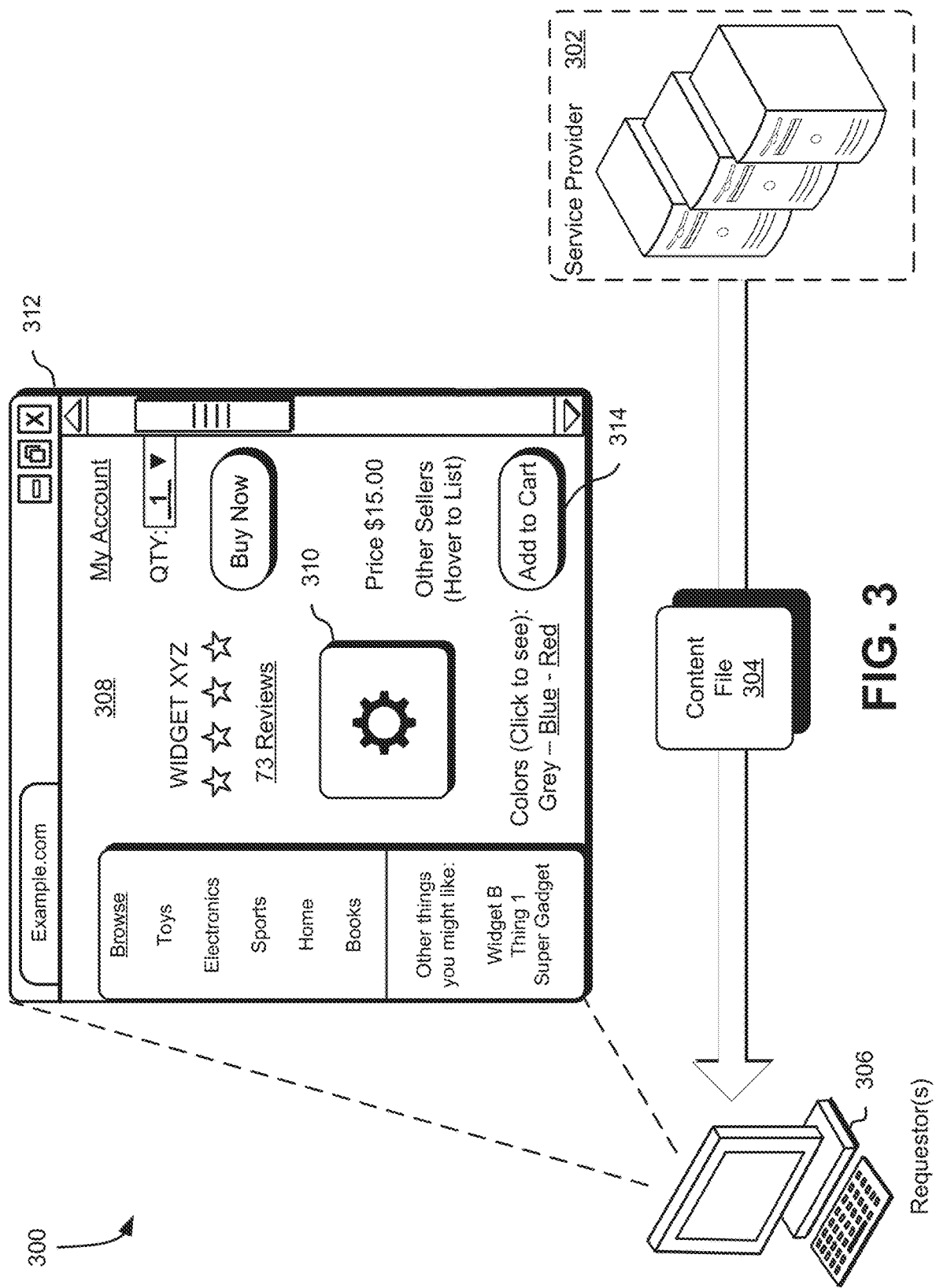
FIG. 3 illustrates a diagram depicting provision and rendering of substitute web content.

FIG. 3 depicts a diagram 300 for providing and processing substitute web content information according to various embodiments implemented herein. A service provider 302 may provide, in response to receiving a request for web content information as described above, one or more web substitute web content files 304 to a requestor computing device 306. The content file(s) 304 may be generated or rendered by a rendering service of the service provider 302, such as the rendering service 208 described above with respect to FIG. 2. The content file 304 may be formatted according to a file format usable by a browser or application for presenting web content. The format may be a proprietary format associated with the application or browser used to generate the request provided by the requestor computing device 306, such as a proprietary format used by a proprietary application, such as a mobile device application, or may with one or more formats used to for presentation on web pages, such as .html" (i.e., HTML), ".css" (i.e., CSS), ".xml" (i.e. Extensible Markup Language), ".js" (i.e., Javascript), ".svg" (i.e., Scalable Vector Graphics), or any other such similar web content file format.

Moreover, the content file 304 may comprise substitute web content information that, upon processing by the application or browser on the requestor computing device 306, may cause the requestor computing device 306 to render substitute web content or web content 308 for a user (e.g., human or automated agent). The content file 304 may include executable code that, upon execution by the requestor computing device 306, display visual content of the substitute web content 308 that matches, highly resembles, or appears to be identical to the authentic or original web content provided by the content service 210 described above (i.e., original HTML code provided as a result of development). The substitute web content information may be lightweight (e.g., require less computational power for processing, occupy less storage space in memory) relative to original web content information that would be provided to a human user. The substitute web content information may include information that causes an automated agent to be directed to an application programming interface ("API") or other web interface configured to generate substitute web content visually conveying the same information that the original web content would convey to a human user, but requiring less computation or memory than the original web content (e.g., plaintext values or JSON objects instead of content with graphics and animation). Accordingly, the substitute web content information may save on computational resources and may help both the service provider and customer computing devices run faster and more efficiently.

The content file 304 may include one or more data objects comprising data for rendering visual media content, such as image information, moving picture information, or other such information. The content file 304 may comprise authentic web content information useable to generate an authentic version of the web page or web content requested, or substitute web content information useable to generate a substitute version of the web content or webpage requested. The content file 304 may comprise both authentic web content information and substitute content information such that one or more objects rendered are authentic versions of the web content objects and one or more objects rendered are substitute versions of the web content objects. The data objects may include data formatted according to one or more known visual media formats, such as image file formats (e.g., BMP, JPEG, PNG, TIFF), moving image formats or codecs (e.g., AVI, FLV, MOV, WMV, MP4, MPG, H.264, SVG), text formats (TXT, DOC, DOCX, RTF), or universal file formats (e.g., PDF, XFDF, FDF). The one or more data objects may also be provided according to a data format unique to the application or browser rendering or requesting the web content, such as a proprietary data format.

The application or browser on the requestor computing device 306 may process the content file 304 and render the substitute web content 308 for the user. As discussed above, the substitute web content 308 rendered may include one or more visual elements that appear, to a human user, identical to the authentic web content that would have originally been provided by the content service 210 (e.g., the original HTML file) to the computing device an authenticated or human user (e.g., user associated with information indicating a high confidence of a human user). The substitute web content 308, for example, may be programmed to cause a single image to be rendered (e.g., in BMP format), by the requestor computing device 306, that would appear identical to the web content that would have been rendered using the authentic or original web content. One or more visual elements rendered using the content file 304 may be identical to corresponding visual elements that would have been rendered using the original web content. For example, a visual element 310 of a product offered for sale by the service provider 302 may appear identical to the product image in the original product page, but the entire substitute web content 308 may be in the form of an image file instead of an HTML file. The visual element 310 generated in this example corresponds to substitute web content information, generated by a rendering service of the service provider 302, that is useable to render substitute web content that appears to be identical to the authentic web content, but which does not appear to an automated agent as an interactive object (i.e., HTML object).

A human user viewing the substitute web content 308 will perceive that they have received the web content that was requested because the substitute web content file 304 is configured to cause a browser 312 to render substitute web content 308 with an appearance identical to the requested webpage or web content. However, the content file 304 may not contain code that causes the browser 312 to render web content 308 without elements identified as being interactive or that an automated agent would understand to be interactive. That is, web content 308 rendered may be associated with source code that does not include interactive objects, such as links to other webpages, buttons, radio objects, character input fields, or similar objects that an automated agent would understand to be interactive based on the associated source code. Instead, the web content 308 rendered may comprise one or more visual data objects, such as images, that do not appear to be interactive. Automated agents typically inspect the source code provided in association with web content to map or document the interactive objects available in the web content, then successively access or crawl the interactive objects to determine a response to the interaction, such as causing the agent to navigate to a different webpage or update content on the webpage. Accordingly, when an automated agent accesses the web content 308, such as via a link provided in different web content or a different webpage, the automated agent may determine that it cannot access further web content or webpages via the web content 308, or interact with data objects provided in the web content 308. The automated agent will therefore navigate away from the web content 308 without attempting to interact with it because it perceives the web content 308 as a dead end. By contrast, most human users will perceive that the web content 308 rendered on a display device associated with the requestor computing device 306 corresponds to the web content that they requested. The human users will therefore attempt to interact with the web content 308 by clicking, for example, objects which appear to be interactive, such as the "Add to Cart" visual element 314 depicted in FIG. 3. The content file 304 may include both authentic web content information, useable by the requestor computing device 306 to generate authentic versions of the web content requested, and substitute web content information. As discussed above with respect to FIG. 2, the web content of the content file 304 rendered by the rendering service may be generated based at least on secondary information associated with the web content requested and/or on bot detection information. Moreover, the substitute web content 308 may include programming or code that causes the browser or application presenting the content 308 to make the visual elements therein behave in a manner identical or similar to the corresponding original webpage, as described below.

Figure 4:
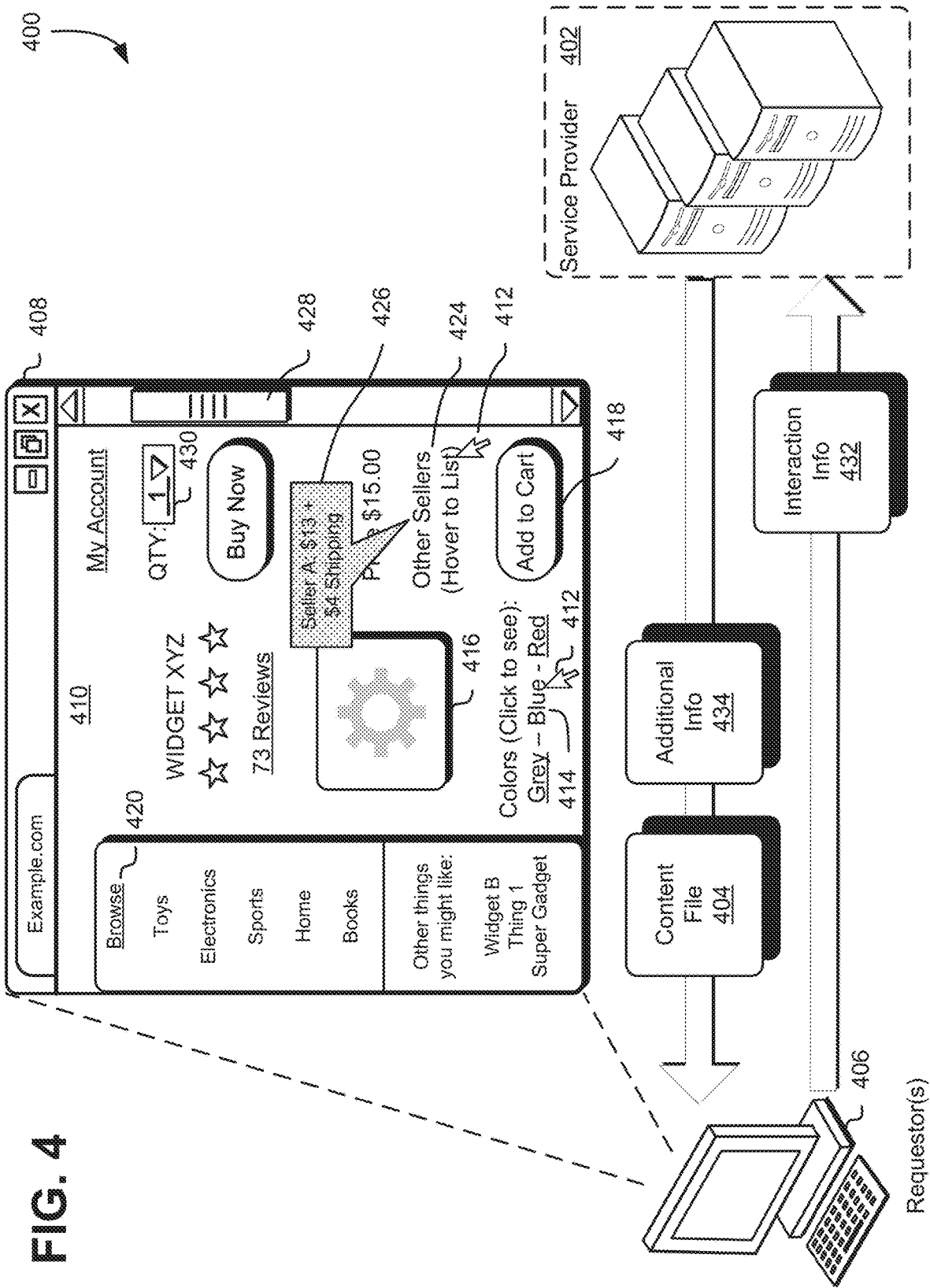
FIG. 4 illustrates a diagram depicting information exchange based on interaction with the substitute web content rendered.

FIG. 4 is illustrative diagram 400 for providing and processing substitute web content information according to various embodiments implemented herein. A service provider 402 may provide, in response to receiving a request for web content information, one or more substitute web content files 404 to a requestor computing device 406. The substitute web content files 404 may be programmed or coded to cause the web browser or application 408, after rendering the substitute web content 410 on the requestor computing device 406, to capture user inputs and transmit the user inputs to the service provider 402. The substitute web content 410 may include one or more areas in which associated user input may be detected. The one or more areas may detect various user inputs provided, such as button clicks (e.g., left or right mouse clicks), mouse movement, cursor position, character input (e.g., hardware keyboard, on-screen keyboard), scroll-wheel, or touch-screen inputs. For instance, the substitute web content file 404 may cause the browser 408 to detect a position of a cursor 412 in relation to the substitute web content 410. Upon detecting that the cursor 412 positioned over area 414 and that a button click (e.g., left mouse click) is detected, or that a touchscreen input is received at the area 414 (i.e., user contact with screen), the web content file 404 may cause the browser 408 to respond accordingly, such as by changing the appearance of the substitute web content 410 to include a product visual element 416 for a product "Widget XYZ" having a blue product instead of the grey product depicted in the visual element 310.

The substitute web content file 404 may cause the browser 408 to perform one or more actions for the response or in association with the response. The substitute web content file 404 may cause the browser 408 to modify or exchange one or more elements of the substitute web content 410 based on the input received, or may cause the browser 408 to replace the substitute web content 410 with other web content based on the input received. The substitute web content file 404 may include one or more data objects corresponding to elements of the substitute web content 410 that may be exchanged or modified. For example, in response to detecting that the "blue" In one aspect, the browser 408 may modify the area corresponding to the product depicted in the visual element 416 to have a blue color, or may exchange the entire visual element 310 having a grey color with a visual element 416 having a blue color, such as by causing a stored data object (e.g., image file) of the visual element 416 to an image of a product having a blue color to be rendered. As another example, the browser 408 may replace or exchange the entire substitute web content rendered (e.g., with the visual element 310 having a grey color) with the substitute web content 410 having the visual element 416 with a blue product. By replacing, exchanging, or modifying visual elements of the substitute web content 410, or replacing the substitute web content 410 with an appropriate corresponding substitute web content 410, in response to detected user input, human users may not perceive a difference between the substitute web content 410 and the originally requested web content.

The user interactions detected and the responses thereto are not particularly limited. Several types of user interactions and responses are depicted in the substitute web content 410. As one example, one or more button visual objects, such as the "Add to Cart" object 418, that are identical in appearance to the corresponding button objects on the original page may be provided that cause a response to be generated when interacted with. When the cursor 412 is positioned over the button visual object 418 and a mouse click input is received (i.e., from a mouse device connected to the requestor computing device 406), the browser 408 may generate information regarding the user interaction to add a specified quantity of the product to the user's virtual shopping basket. As described above, detection of user input from touchscreen presses or gestures instead of mouse inputs is contemplated as being within the scope of the present disclosure. The web content 410 may include one or more link visual objects 420, identical to link objects to other webpages (e.g., hyperlinks) of the original web content, that the user may interact with to navigate to another webpage.

The content file 404 may cause the browser 408 to perform other responses based on user inputs. The content file 404 may, for instance, cause the browser 408 to detect movement of a mouse device connected to the requestor computing device 406 or movement of the cursor 412 within the browser 408. The content file 404 may also cause the browser 408 to detect when the cursor 412 is hovering over a data object for a predetermined period of time (e.g., 1 second), such as the "other sellers" visual data object 424. In response to detecting the hover user input, the content file 404 may cause the browser 408 to generate a pop-up box or window visual object 426 providing additional information or other response defined by the content file 404. As a further example, the content file 404 may cause the browser 408 to scroll section of the substitute web content 410 presented to another section of the substitute web content not presented in the browser 408 by detecting a user input associated with a scrollbar visual object 428, such as by detecting movement of a scrollbar input device on a mouse, or detecting a held mouse click with the cursor 412 positioned over the scrollbar visual object 428 in association with movement of the mouse. The substitute web content 410 may also include a radio selection visual object 430 for selecting one of a predetermined number of options, such as quantity of the product that the user wishes to purchase. User interaction with the radio selection visual object 430 may cause the visual object to expand and illustrate the quantity product that the user may select. Those of ordinary skill marital appreciate that the user actions discussed herein are non-exhaustive examples of the myriad user interactions that the substitute content file 404 may be configured to cause the browser 408 detect.

The content file 404 may cause the browser 408 to transmit interaction information 432 regarding user interactions to the service provider 402. The information regarding user interactions may include information regarding inputs received via the requestor computing device 406. The interaction information 432 may be provided in association with other information, such as information identifying one or more visual data objects associated with one or more user interactions causing generation of the interaction information 432. The service provider 402 may process the interaction information 432 and provide additional information 434 in response. The requestor computing device 406 may process the additional information 434 in association with the content file 404. The additional information 432 may be another substitute web content file provided to replace the content file 404 causing generation of the interaction information 432. The additional information 434, upon processing or execution by the browser 408, may cause modification of the substitute content 410 rendered. For instance, the additional information 434 may cause the browser 408 to display the visual pop-up window or box object 426, or present the visual element 416 is a blue product instead of a grey product, as described above. In one embodiment, the additional information 434 may cause the substitute web content 410 to be replaced by a different substitute web content 410, such as by replacing a substitute web content 410 rendered without the visual pop-up window or box object 426 with a substitute web content for time rendered with the visual box object 426. The substitute web content 410 that replaces the initially provided substitute web content 410 may be a new substitute web content or webpage corresponding to navigating to a web page associated with one of the visual link objects 420. In one embodiment, the content file 404 may be configured to cause the browser 408 or requestor computing device 406 to generate the additional information 434 on its own instead of receiving it from the service provider 402. However, in such an embodiment, the content file 404 may still be configured to provide interaction information 432 to the service provider 402 in order to enable the service provider 402 to record information regarding behavior of the requestor for spot detection purposes.

The rendering service of the service provider 402 may include locally accessible memory (e.g., cache memory) for storing the content file 404 and/or the additional information 434. The content file 404 and/or the additional information 434 may be previously generated information stored prior to receiving the request for web content or interaction information 432, and obtained by the rendering service of the service provider 402 based on network traffic information instead of generating the information as a response. For instance, the rendering service may obtain an analysis, either from another service or generated on its own, assessing information gained regarding current network trends and browser traffic. The rendering service may pre-render web content information and store the web content in a local rendering node of the rendering service. Accessing the stored web content at a location closer to the requestor reduces latency and allows users to quickly access web content. The rendering nodes may pre-cache web content, such as visual elements and data objects described herein, for web content that is popular to obviate the need to generate web content in response to every request or interaction.

In one embodiment, the requestor computing device 406 may process the interaction info 432 to respond to user interactions using information provided in the content file 404. An application configured to run service provider web content on the requestor computing device 406, such as a proprietary mobile device application, may process the content file 404 to determine an appropriate response to a user interaction without synchronously communicating with the service provider 402. That is, the application may render the substitute web content 410, including producing responses to user interactions, without receiving the additional information 434. The application may cause the requestor computing device 406 to send interaction information 432 to the service provider 402 to allow detection or determination of automated agent activity.

Figure 5:
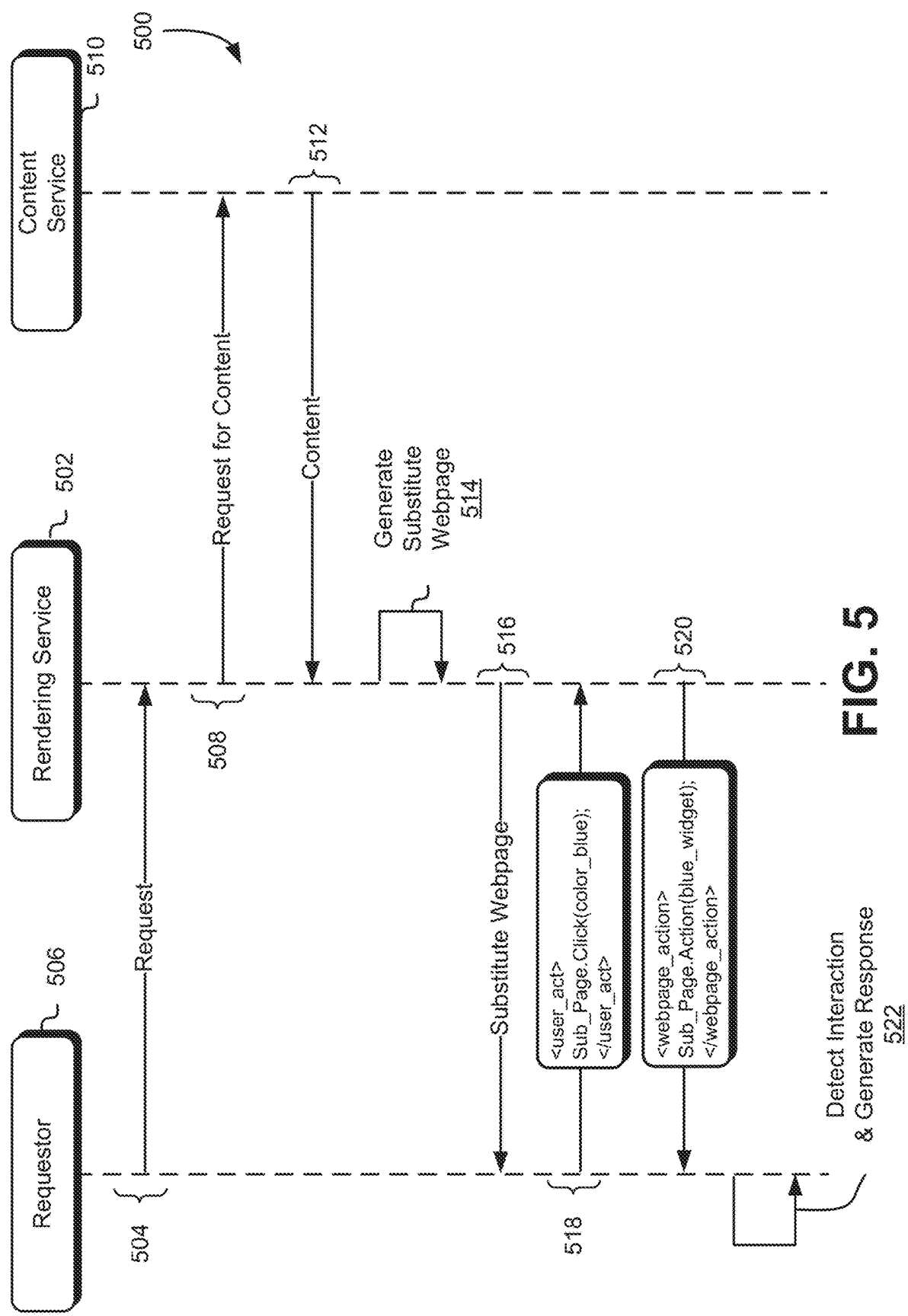
FIG. 5 illustrates a communication diagram showing communications for showing provision of web content information for generating substitute web content information.

FIG. 5 is an illustrative example of a communication diagram 500 in which various computing resources may communicate for provision of web content according to various embodiments of the present disclosure. A rendering service 502 of a computing resource service provider receives, via an interface service as described above, a request 504 from a requestor computing device 506 for web content. The rendering service 502 may send a request 508 for web content to a content service 510, which may process the request 508 and provide the requested content 512 in a manner as described above with respect to FIG. 2, such as by determining which content to provide based on policy information received from a policy service. The rendering service 502 may generate 514 substitute web content or webpage instead of the requested web content using the content 512 received, and provide 516 the web content file to the requestor computing device 506. The rendering service 502 may generate 514 the substitute web content in a manner as described above, such as based on policy information received from the policy service.

The requestor computing device 506 may process the content file, using a web browser or application as described above for example, and present the substitute web content generated thereby to the user. The requester computing device 506 may detect user interaction with the substitute web content, as described above. The requester computing device 506 may detect a user interaction and provide 518 the information regarding the user interaction to the rendering service 502 via the interfacing service. The rendering service 502 may process the user interaction and generate a response comprising the additional information described above with respect to FIG. 4, and provide 520 the response to the requestor computing device 506. For instance, the user interaction depicted in diagram 500 corresponds to a user interaction of clicking the area 414 in FIG. 4 for requesting the requestor computing device 506 to display a blue "Widget XYZ" product. The rendering service 502 processes the user interaction and provides 520 the response having additional information sufficient to enable the requestor computing device 506 to fulfill the request to display the blue "Widget XYZ" product. The content file may include information sufficient to respond to user interactions without communicating with the service provider. In response to detecting the user interaction, the requestor computing device 506 may generate 522 a response on its own using information in the content file or provided in association therewith.

Figure 6:
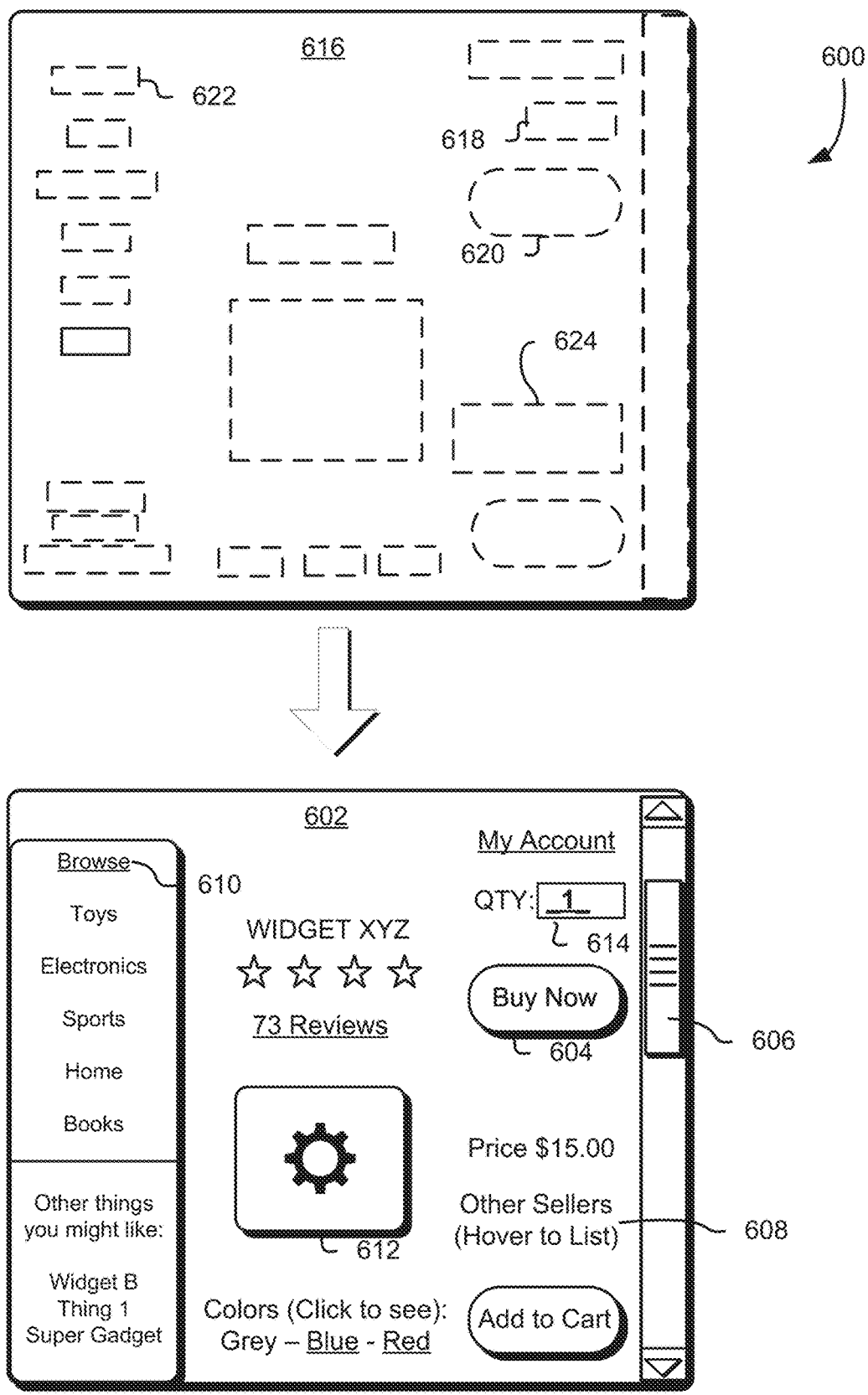
FIG. 6 illustrates a diagram showing layers of substitute web content rendered by a computing device.

FIG. 6 is an illustrative example of substitute web content 600 generated by a browser or application processing a content file provided by a rendering service of a service provider. The web content 600 may be generated according to include one or more information components or layers. A first layer 602 includes one or more visual elements that appear identical to corresponding data objects that would have been displayed by rendering content for the authentic or original content requested. The first layer 602 may correspond to a presentation layer that includes visual elements described or depicted with respect to FIG. 4, such as a "buy now" button visual element 604, a scrollbar visual element 606, an "other sellers" visual element 608, a "Browse" link visual element 610, a product visual element 612, and a radio selection visual object 614, by way of non-limiting example. Although the first layer 602 is described as comprising visual elements, the first layer 602 may be a single visual data object or single image depicting the one or more visual objects. The visual elements of the first layer 602 are objects that an automated agent would not interpret as being non-interactive visual data objects, such as an image object.

A second layer 616 of the web content 600 may include one or more areas for user interaction detection corresponding to the visual elements in the first layer 602. The second layer 616 may be implemented as part of a hidden engine provided by the service provider for allowing the browser to asynchronously communicate with the one or more servers of the rendering service. The areas may be associated with one or more actions to be performed in response to detecting one or more user interactions. The first layer 602 may overlay the second layer 616 such that a human user cannot see the second layer, but interactions with the second layer 616 can be detected without displaying it. A first area 618 of the second layer 616 may be associated with the radio selection visual object 614 such that user selection (e.g., clicking, touching) within the first area 618 may cause the browser rendering the web content 600 to present a drop down menu visual object in the first layer 602. As another example, a second area 620 of the second layer 616 may be associated with the "buy now" button visual element 604 of the first layer 602 such that user selection within the second area 620 may cause the browser to transmit a request to the service provider to process a purchase request in association with account information of the user. As a third example, a third area 622 of the second layer 616 may be associated with the "Browse" link visual element 610 such that user selection within the third area may cause the browser to transmit a request to access web content corresponding to the "Browse" link. As another example, a fourth area 624 of the second layer 616 may be associated with the "other sellers" visual 0608 of the first layer 602 such that a cursor positioned within the fourth area 624 for a time period exceeding a predetermined period of time (e.g., 1 second) may cause the browser to display a pop-up window or box, as described above with respect to FIG. 4.

In one embodiment, the browser may detect user input or user interaction in association with the first layer 602 without utilizing areas for user interaction detection, and provide information regarding the user input/interaction to the service provider. Information generated based on the user input or user interaction may include information indicating position, movement, content, and/or timing of the user input or interaction in association with the first layer 602. The browser may obtain information for user input of input a position of the cursor, including how long a cursor has been in a given position; movement of the cursor or mouse; button input or clicks; text input; touchscreen input, including position and content (e.g., gestures); and so forth.

Figure 7:
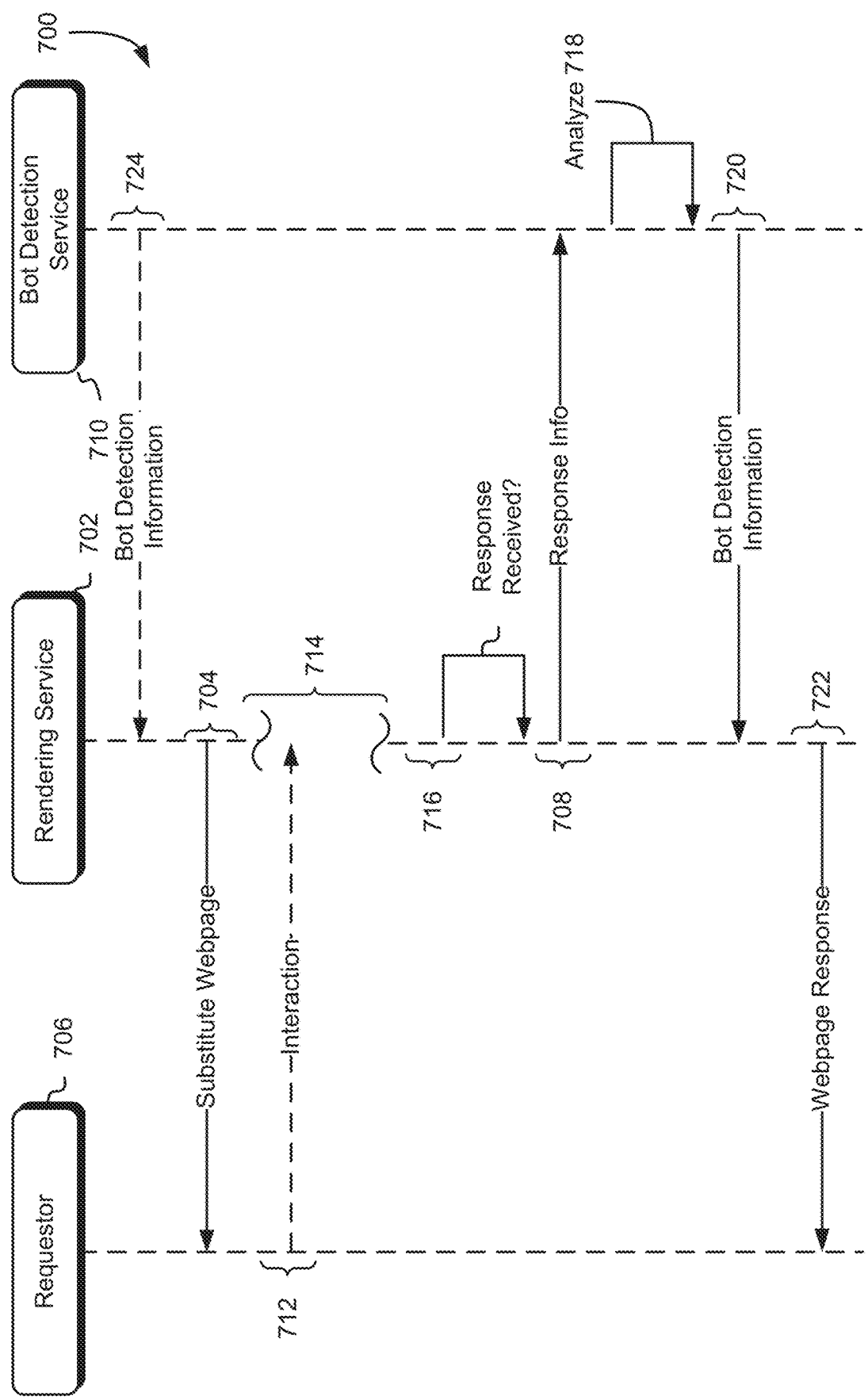
FIG. 7 illustrates a communication diagram showing communications providing information related to detection of automated agent activity.

FIG. 7 is an illustrative example of a communication diagram 700 in which various computing resources may communicate for provision of web content according to various embodiments of the present disclosure. The diagram 700 illustrates that a rendering service 702 of a service provider provides 704 a requestor computing device 706 with substitute web content, as described above. After providing the substitute web content, a service of the service provider, such as the rendering service 702, may provide response information 708 to a bot detection service 710. The bot detection service 710 corresponds to the bot detection service described above with respect to FIG. 2 and elsewhere. The response information 708 corresponds to information characterizing or describing a user interaction of a user with substitute web content rendered on the requestor computing device 706, or an absence of the user interaction.

The response information 708 transmitted may indicate the absence of an interaction with the substitute web content if the rendering service 702 does not receive user interaction information 712 from the requestor computing device 706 within a predetermined period of time 714 (as indicated by dashed line) after providing 704 the substitute web content. The rendering service 702 may wait the predetermined period of time 714 after provision 706 of the substitute web content before generating the response information 708, and generate the response information 708 after determining 716 that a response was not received within the predetermined period of time 714. The response information 708 may indicate that user interaction information was not received from the requestor computing device 706 within the predetermined period of time 714, and may indicate identification information of the requestor (e.g., account information, IP address, host address), and information regarding the web content requested and/or the substitute web content provided. The predetermined period of time may be a predetermined time indicated by a parameter stored in data storage accessible by the rendering service 702. The failure to receive interaction information 712 from the requestor computing device 706 within the predetermined period of time 714 may indicate that the requestor is an automated agent that did not interact with any visual element of the substitute web content, as described herein.

The requestor computing device 706 may provide interaction information 712 indicating one or more aspects of a user interaction with the substitute web content. The one or more aspects may include a location of interaction, such as an x-y coordinate location identification of where a user touched a touchscreen or where a cursor was located when the user input was initiated (e.g., mouse click); an identification of a visual element that the user interacted with, such as an identifier of the "buy now" button; a time elapsed from when the substitute web content was rendered until the user interaction occurred; a type of user interaction, such as a single mouse click, a double mouse click, a scroll wheel roll, text input received from a hardware or on-screen keyboard; or any other user input for interacting with the substitute web content. The interaction information 712 may also characterize the user interaction according to the visual element interacted with—for example, by indicating a user interaction for purchasing a quantity of a product in association with a user account, such as "Widget XYZ", by clicking a "buy now" button visual element or an "add to cart" visual element. Receiving the interaction information 712 within the predetermined period of time 714 may be an indication that the requestor computing device 706 is operated by a human user able to perceive the visual elements in the substitute web content rather than an automated agent that is not capable of, or programmed to, successfully interact with the one or more visual data objects of the substitute web content.

The bot detection service 710 may receive the response information 708 from the rendering service 702 and perform an analysis thereof. The bot detection service 710 may analyze the response information 708 to determine a confidence that the requester computing device 706 is an automated agent. In one embodiment, the bot detection service 710 may analyze the interaction information 712 to determine the presence or absence of automated agent interaction based on a set of factors, and adjust a confidence that the requestor computing device 706 is controlled or operated by an automated agent or a confidence that the requestor computing device 706 is controlled or operated by a human user. Adjusting the confidence of an automated agent, as described herein, may be reflected in a numerical value that indicates a confidence that the requestor computing device 706 is controlled by an entity of a certain type. The numerical value may be a score or indication of probability that the requestor computing device 706 is controlled by an automated agent.

One factor that the bot detection service 710 may consider in adjusting a confidence associated with the requestor computing device is whether the interaction information 712 indicates that the requestor computing device 706 interacted in an irregular manner or a manner inconsistent with a context with the substitute web content, such as by clicking on an area that does not include an interactive visual element (e.g., "buy now" visual element), interacting with a visual element in a manner contrary to instructions provided on the substitute web content or a manner contrary to what a human user typically would (e.g., double-clicking on "other sellers" visual element that instructs user to "hover", right-clicking on "buy now" button, receiving random or nonsense keyboard inputs). The presence of an irregular interaction may increase a confidence that an automated agent interacted (via the requestor computing device 706) with the substitute web content, and the presence of a regular interaction or interaction consistent with the substitute web content may increase a confidence that a human user interacted with the substitute web content. Another factor that the bot detection service 710 may consider is whether the requestor computing device 706 failed to interact with the substitute web content, such as by failing to interact with the substitute web content within the predetermined period of time 714 or by navigating away from the substitute web content without interacting therewith. The failure to interact with the substitute web content may increase a confidence that an automated agent interacted with the substitute web content. Other factors that may increase confidence that an automated agent attempted to interact with the substitute web content are identification information of the requestor computing device 706 being associated with an automated agent; the requestor computing device 706 exhibiting web-crawling behavior, such as by systematically accessing large portions of a website associated with the substitute web content; or by sending a large number of requests to access web content of the service provider within a short period of time (e.g., denial-of-service attack). Those of ordinary skill in the art will appreciate that these factors are non-exhaustive and merely illustrative of the indicia of automated agent behavior.

The bot detection service 710 may analyze 718 the response information 708 to determine whether the requestor computing device is controlled by an automated agent or a human user. Based on the analysis, the bot detection service 710 may provide bot detection information 720 providing an indication (e.g., confidence) of whether the requestor computing device 706 is controlled by an automated agent or an indication of confidence that the requester computing device 706 is controlled by a human user. The indication may be a numerical value of the likelihood of automated agent activity associated with the requestor computing device 706 (e.g., 0.75 confidence of bot activity), or a binary indication of whether the bot detection service 710 determined that the requestor computing device 706 is controlled by an automated agent. The automated agent detection indication may be based on the response info received (i.e., in 708), or may be based on an analysis including previously obtained or produced information indicating automated agent activity associated with the request or computing device 706, such as previous behavior indicating automated agent activity (e.g., web crawling behavior). The previously obtained or produced information associated with the requester computing device 706 may be stored in data storage (e.g., memory, database) accessible by the bot detection service 710 for storing behavior information in association with identification information for one or more users.

The rendering service 702 may provide a webpage response 722 based at least in part on the indication of automated agent activity received. In one embodiment, in response to receiving an indication that the requestor computing device 706 is associated with automated agent activity, the rendering service 702 may not provide a webpage response 722 at all. The webpage response 722 may be a response indicating an error (e.g. HTTP 404 error), or other such web content that would be unusable in accessing web content. The rendering service 702 may discontinue receiving requests and/or providing responses to the requestor computing device 706 altogether. The rendering service 702, in determining the webpage response 722, may consult with a policy service, as described above with respect to FIG. 2, to determine a response that would be appropriate to provide based on the indication of automated agent activity received. On the other hand, if the indication received from the bot detection service 710 indicates that the requester computing device 706 is controlled by the user, then the rendering service 702 may provide a webpage response 722 appropriate to the interaction information 712 received, such as by fulfilling a request to provide information (e.g., request for price information), or by appropriately processing or fulfilling the request (e.g., fulfilling "buy now" request, providing web content for "browse" visual element).

The rendering service 702, before providing the web content 704 to the requester computing device 706, may consult with the bot detection service 710 to determine what web content to provide. In one embodiment, the rendering service 702 may send a request (not shown) to the bot detection service 710 to provide information indicating whether the requestor computing device 706 is controlled by an automated agent or a human. The request to the bot detection service 710 may be based on receiving, by the service provider, a request to provide web content, as described above with respect to FIG. 1 and elsewhere herein. The request to the bot detection service 710 may include information for identifying the requestor computing device 706 (e.g., MAC address, IP address, hosting address, user account information). The bot detection service 710 may access information, in data storage as described herein, regarding whether the requestor computing device 706 is controlled by an automated agent or a human, and provide bot detection information 724, as described above, including information to the rendering service 702 regarding whether the requestor computing device 706 is controlled by an automated agent based on the information accessed.

The rendering service may provide web content information to the requestor computing device 706 based on the bot detection information 724. For instance, in response to receiving bot detection information 724 indicating a high confidence that the requester computing device 706 is controlled by an automated agent, the rendering service 702 may provide substitute web content to the requester computing device 706 instead of the web content requested. Conversely, in response to receiving bot detection information 724 indicating a high confidence that the requester computing device 706 is controlled by a human user, the rendering service 702 may provide authentic web content corresponding to the web content originally requested so as to appropriately fulfill the request for web content instead of providing the substitute web content. In one embodiment, the rendering service 702 may provide substitute web content in response to receiving bot detection information 724 indicating a high confidence that the requester computing device 706 is controlled by the human user.

Figure 8:
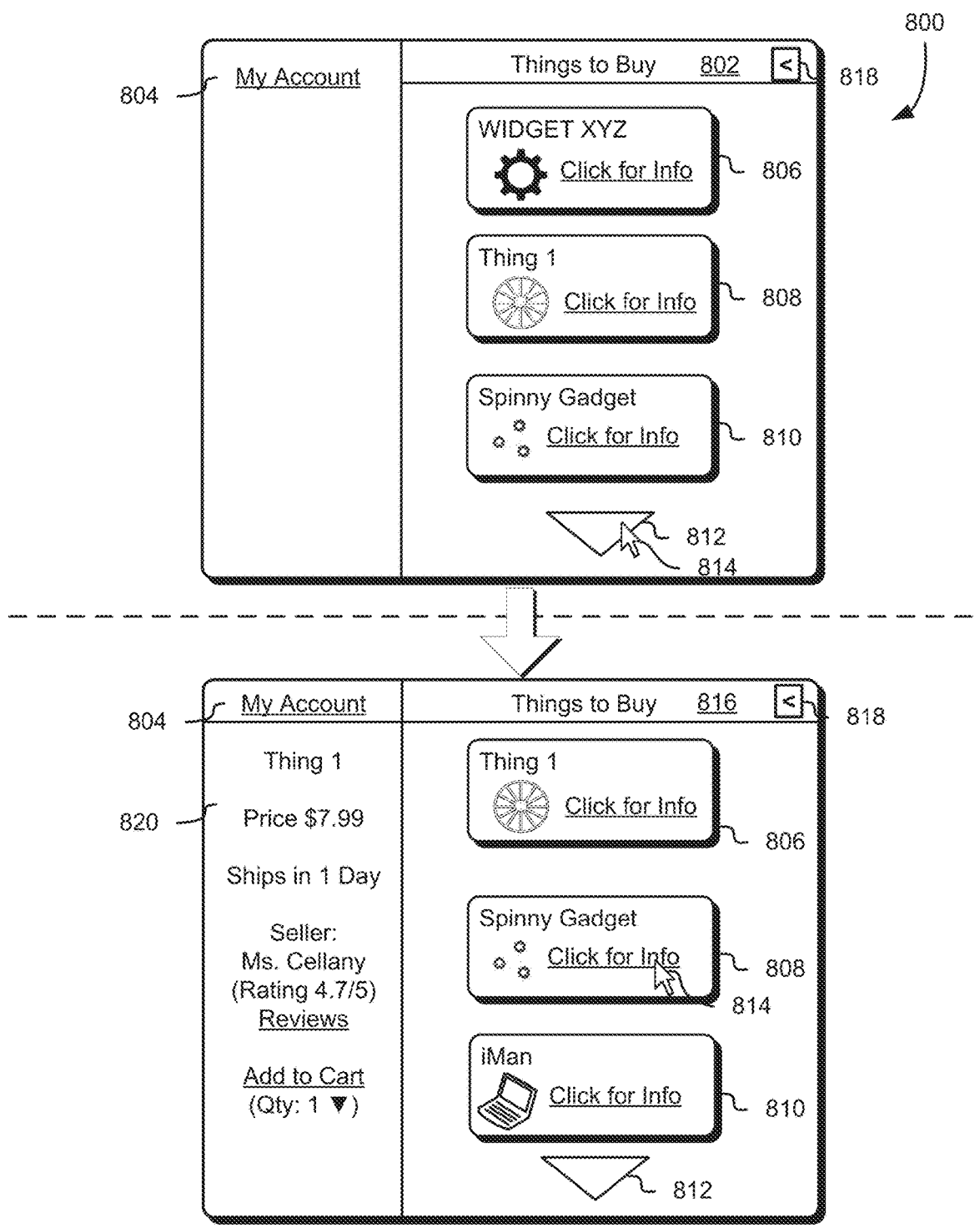
FIG. 8 illustrates diagram showing web content rendered by a computing device.

FIG. 8 is a diagram 800 of web content 802 generated using web content information provided by a service provider. The web content 802 is generated from web content information provided by a rendering service, as described herein. The web content 802 includes a set of objects generated on a computing device for presentation to a requestor. The web content 802 may include a set of authentic objects that are each an authentic version of a webpage object, and may include substitute objects that are each a substitute version of a webpage object. The set of authentic objects and the set of substitute objects included in the web content information provided by the rendering service may be determined based on the content information provided by the content service and/or the bot detection service described above. Alternatively, the set of authentic objects and the set of substitute objects may be determined randomly. A first object 804 in the web content 802 may be an authentic object that has an interactive aspect (e.g., HTML object, JS object, CSS object) whereas one or more of a second object 806, a third object 808, and a fourth object 810, and a fifth object 812 are substitute web objects that are visual elements that would appear as a non-interactive object to an automated agent (e.g., BMP image).

Subcontent in the web content 802 may change from a first state to a second state, such as changing from a substitute version to an authentic version, and vice versa. The second object 806 may change from being a substitute version of web content to an authentic version. The change from one state to another may be based on a user interaction with subcontent of the web content 802. The detection may be performed by one or more processes running in the background. The subcontent may be changed based on a determination of whether a user interaction with the web objects is behavior that an automated agent would exhibit or behavior that a human user would exhibit. For instance, a user may interact with the fifth object 812 (e.g., a substitute version) by clicking on the third object 808 with a cursor 814 to display more items. Because the interaction is with a substitute version that an automated agent would not understand to be an interactive object, the user may be identified as being associated with human user activity rather than automated agent activity. The user interaction being an indication of human user activity may cause the bot detection service to increase a confidence that the user is a human user. In response, the web content 802 may change to a second state 816 wherein one or more of the substitute versions are changed to authentic versions. Conversely, if the user clicked on a different feature, such as a back button 818 having an interactive aspect (e.g., HTML object), without interacting with any of the substitute web content, the bot detection service may increase a confidence that the user is associated with automated agent activity.

In the second state 816, one or both of the third object 808 and the fourth object 810 may be changed to authentic versions of the web content that appear as having an interactive aspect. Clicking on the third object 808 may cause additional information 820 to be displayed regarding the product corresponding to the third object 808. The additional information 820 may include substitute web content that an automated agent would not understand to be interactive. Accordingly, the bot detection service may further increase a confidence that the user is a human user.

Figure 9:
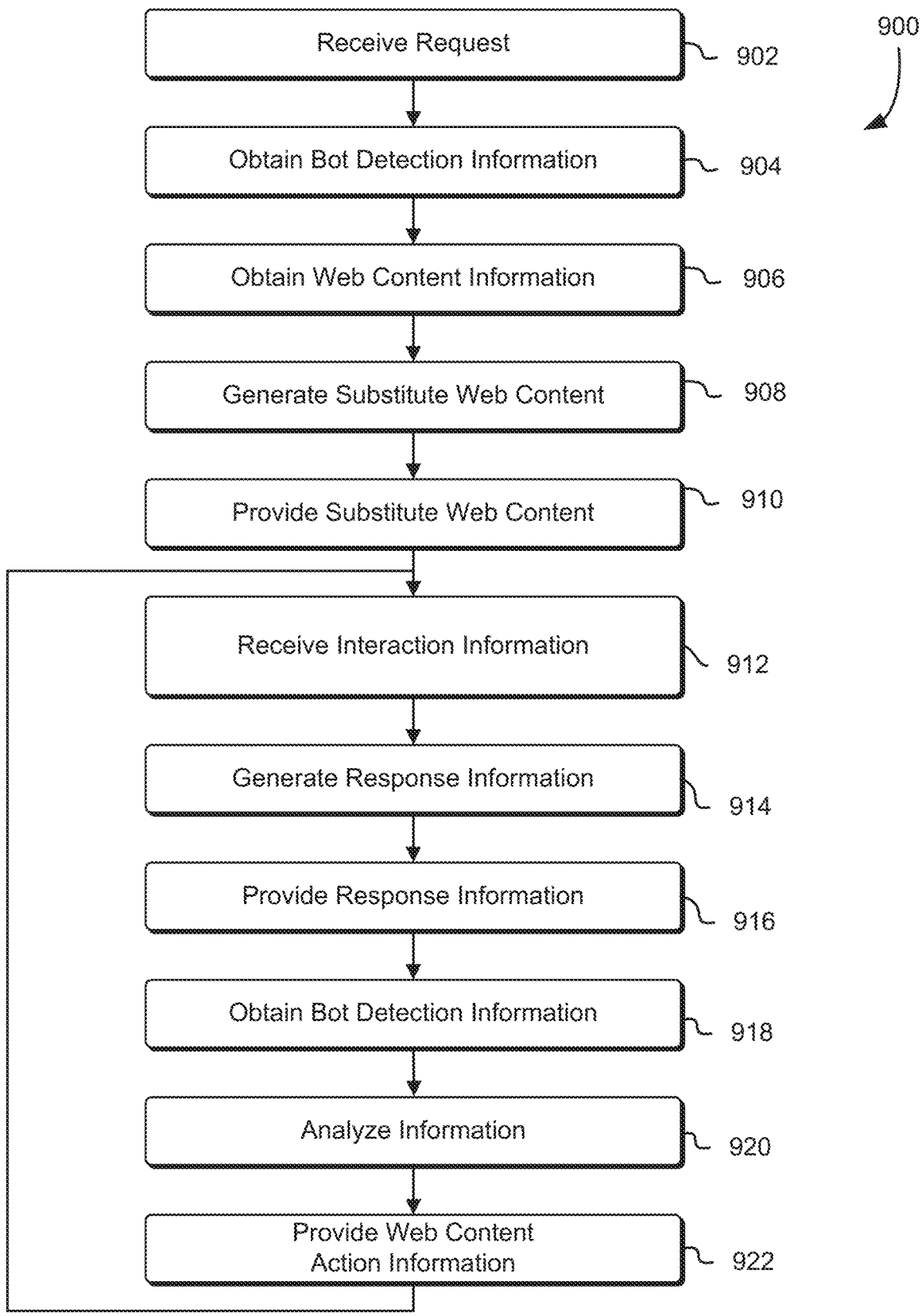
FIG. 9 illustrates a process for providing web content information to a computing device.

FIG. 9 is an illustrative example of a process 900 for providing substitute web content to an entity according to various embodiments implemented herein. The process 900 may be performed by any appropriate system, such as the rendering service of the service provider described herein. The process 900 begins by receiving 902 a request from a requester computing device to access web content, as described above with respect to FIGS. 1, 2, 5, and 7. Optionally, the rendering service may obtain 904 bot detection information from a bot detection service of the service provider, as described above with respect to FIGS. 2 and 7. The rendering service may then obtain 906 web content information for fulfilling the request received. As described above, the web content information may be obtained from a content service of the service provider, and may be obtained based on bot detection information regarding the requester computing device and/or identification information associated with the requester computing device. The web content information obtained may be information usable to render an authentic version of the web content or a substitute version of the web content, as described herein. The rendering service may then generate 908 substitute web content, such as a web content file for generating a substitute webpage, as described above with respect to FIGS. 1 through 7. The rendering service may provide 910 the substitute web content generated to the requester computing device and wait to receive the response thereto. The provision of the substitute web content may cause the rendering service to initiate a timer or counter for measuring a period of time, such as a countdown timer configured to count down from a predetermined amount of time to zero.

The rendering service may receive 912 interaction information from the requester computing device characterizing or describing an interaction of a user of the requester computing device with the substitute web content generated using the web content file provided, as described above with respect to FIGS. 1, 2 and 4 through 7. In one embodiment, the rendering service may wait for a predetermined period of time after initialization of the timer described above to receive a response from the requester computing device, as described above with respect to FIG. 7. The rendering service may then generate 914 response information characterizing one or more aspects of the interaction information received. For instance, the response impression generated may characterize the user interaction or an indication that interaction information was not received within the predetermined period of time. The rendering service may then provide 916 the response information generated to a bot detection service, as described above with respect to FIGS. 2 and 7. The rendering service may optionally obtain 918 bot detection information from the bot detection service. The rendering service may then analyze 920 the information obtained, including the bot detection information and the interaction information, and generate web content action information for causing an action to be presented to the user, via the substitute web content, of the requester computing device. The web content action information may cause the browser rendering the substitute web content to modify one or more of the visual elements depicted therein to simulate a response that the authentic web content would produce, or may cause the browser to generate and display different web content, such as a new substitute web content or webpage. After providing 922 the web content action information, the rendering service may wait to receive further interaction information by returning to step 912. Returning to step 912 may include reinitializing the timer for measuring a predetermined period of time, as described above. The process 900 may terminate based on the failure to receive further user interactions or by receiving an indication that the requester computing device has ceased presentation of the substitute web content (e.g., browser is closed, user navigated to non-service provider web con will tent).

Figure 10:
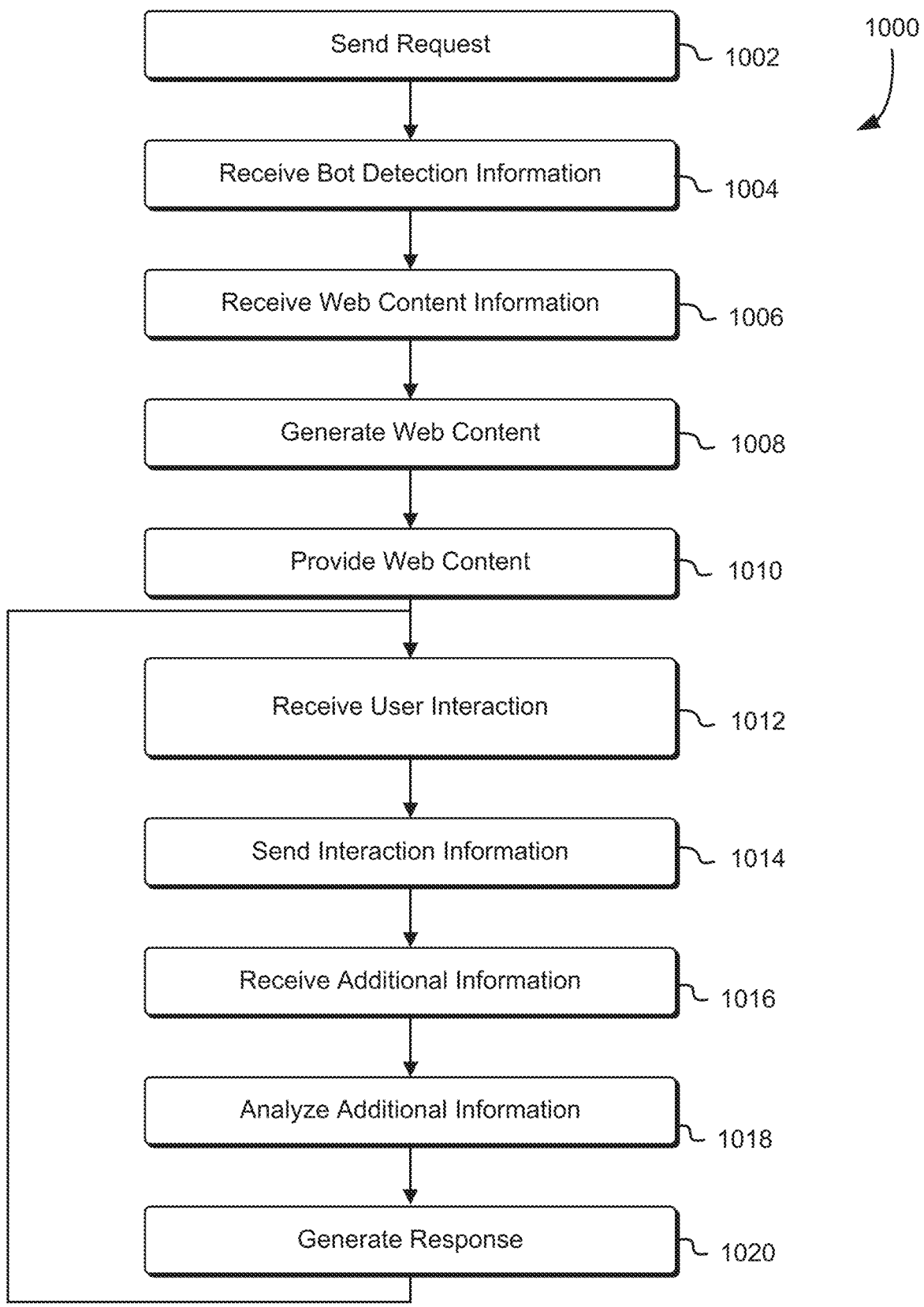
FIG. 10 illustrates a process for rendering web content information by the computing device.

FIG. 10 is an illustrative example of a process 1000 for rendering web content. The process 1000 may be performed by a user computing device running executable code on a web browser or proprietary application, as described herein. The computing device may send 1002, over a network, a request for web content to a service provider. The request may include information identifying what content requested, and may include information regarding the user, such as user account information, host address, IP address, browser information, and the like. The application or browser may receive 1004 bot detection information from the service provider indicating a confidence that the user is an automated agent or a human user. The browser application may also receive 1006 web content information corresponding to the web content requested to the service provider. Using the web content information and the bot detection information, the browser or application may generate 1008 web content to be presented to the user. The web content generated 1008 may include substitute web content that appears identical to authentic web content, as described herein. The browser or application may then provide 1010 the web content generated to the user computing device, thereby causing the computing device to present the web content to the user, for example, via a display device of the computing device.

The browser web application may then receive 1012 user interactions the web content provided the user input device. The browser or application may generate and send 1014 interaction information regarding user interactions with the web content to the service provider. The browser or application may then receive 1016 additional information from the service provider that the browser or application may use to generate a response to user interactions. The browser or application may analyze 1018 the additional information received, and generate 1020 a response to the user interaction received. Those of skill in the art will understand that one or more of the steps described above may be omitted. For example, a proprietary application running on the user computing device may generate 1020 response to a user interaction without sending 1014 interaction information, receiving 1016 additional information, or analyzing 1018 the additional information received. As another example, the step of receiving 1004 bot detection information is optionally performed in some embodiments. One or more of the steps in process 1000 may be performed by the user computing device in the background or in such a manner that they are not detectable or visible to a user interacting with the computing device.

Figure 11:
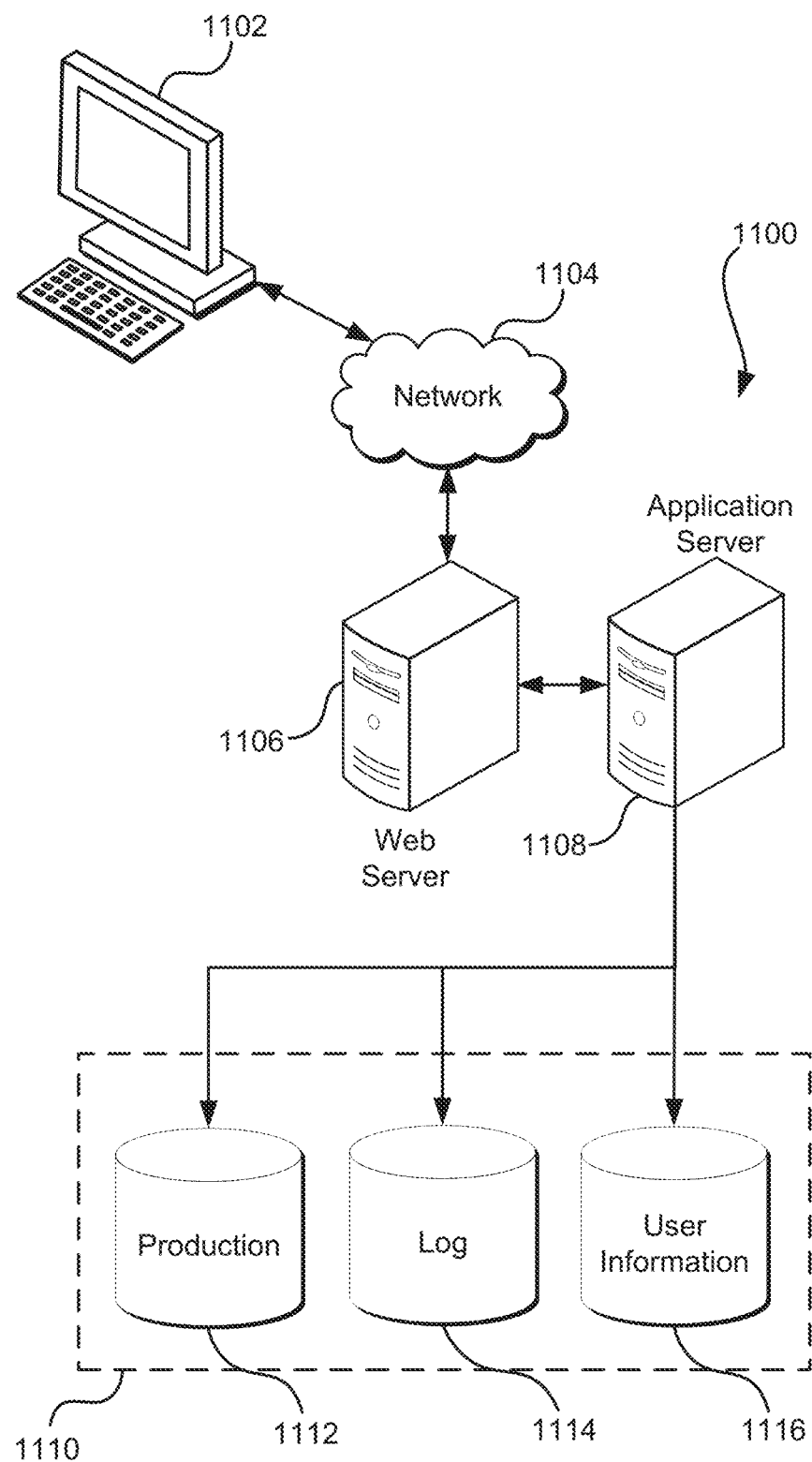
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Dynamic HyperText Markup Language ("DHTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing," are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a request for a webpage;
   obtaining webpage information for the webpage, the webpage information including:
   resource information indicating a resource associated with the webpage accessed as a result of interacting with the resource information; and
   appearance information characterizing an appearance of the webpage including one or more image data objects displayed on the webpage;

generating, using the appearance information, substitute webpage information that, as a result of being processed by a user computing device, causes a substitute webpage to be rendered by the user computing device that omits the resource information, the substitute webpage information generated by at least:

generating a first layer of the substitute webpage information based at least in part on the one or more image data objects, the substitute webpage information, as a result of being rendered by the user computing device has the appearance of the webpage; and generating a second layer including one or more areas for user interaction detection corresponding to the one or more image data objects; and providing the substitute webpage information to a requestor associated with the request instead of the webpage information.

2. The computer-implemented method of claim 1, wherein the substitute webpage information includes response information characterizing a response to be provided in response to an interaction with the one or more image data objects.

3. The computer-implemented method of claim 2, wherein the substitute webpage information, as a result of being processed by the user computing device, causes an application executing on the user computing device to detect user interaction with at least one area for user interaction detection of the one or more areas for user interaction detection, and further causing modification of the substitute webpage rendered based at least in part on the response information.

4. The computer-implemented method of claim 1, further comprising:
   detecting a user interaction with an area for user interaction detection of the one or more areas for user interaction detection corresponding to a resource locator object of the webpage; and
   causing performance of a response to the user interaction based at least in part on behavior information associated with the resource locator object.

5. A system, comprising:
   one or more processors; and
   memory that stores computer-executable instructions that, upon execution, cause the one or more processors to:
   obtain, in response to receiving a request for web content, resource information including information characterizing an appearance of a resource object of the web content, the resource object including interaction data to access a web resource by a computing device;
   generate, based at least in part on the resource information, substitute web content information that, in response to being processed by the computing device, causes a visual element to be rendered omitting the interaction data, the substitute web content information generated by at least:
   determining an image data object of the web content associated with the resource object;
   generating a first layer of the substitute web content information based at least in part on the image data object; and
   generating a second layer of the substitute web content information including an interaction area corresponding to the image data object; and
   provide the substitute web content information to the computing device.

6. The system of claim 5, wherein instructions that cause the one or more processors to generate the substitute web content information further include instructions that, upon execution, cause the one or more processors to generate behavior information, the behavior information causing, in response to a user interaction with the interaction area, performance of a response associated with the web resource mimicking a response to interaction with the resource object.

7. The system of claim 5, wherein the resource object is a Hypertext Markup Language (HTML) object and the visual element is a non-interactive object.

8. The system of claim 5, the computer-executable instructions further causing the one or more processors to:
   receive information regarding a detected user interaction with the interaction area; and
   cause the computing device to display additional information based at least in part on the detected user interaction.

9. The system of claim 8, wherein the computer-executable instructions that cause the one or more processors to cause the computing device to display additional information further include instructions that, upon execution, cause the one or more processors to:
   modify the substitute web content information to display the additional information in a pop-up window.

10. The system of claim 5, the computer-executable instructions further cause the one or more processors to generate authentic resource information corresponding to a second resource object of the web content, the authentic resource information, as a result of being rendered by the computing device, causes the computing device to display an authentic version of a second resource object of the web content, and the substitute web content information includes the authentic resource information.

11. The system of claim 5, wherein the resource information further includes information characterizing a status of the resource object, the status indicating an elevated protection priority for the resource object.

12. The system of claim 5, the computer-executable instructions further cause the one or more processors to detect an absence of an interaction with the interaction area.

13. A non-transitory computer-readable storage medium storing thereon executable instructions that, as a result of being executed by one or more processors of a computer system, cause the computer system to at least:
   obtain resource information related to a web resource, the resource information including visual information that, as a result of being processed by a computing device, causes the computing device to render an appearance of a resource object, and including interaction information that, when interacted with, causes the computing device to access the web resource;
   generate, based at least in part on the resource information, substitute web content information that, as a result of being processed by the computing device, causes a visual element to be rendered, on a webpage, that includes a visual representation of the resource object, the visual element omitting the interaction information, the substitute web content information generated by at least:
   generating a first layer based at least in part on the appearance of the resource object, the first layer including the visual element; and
   generating a second layer including an interaction area corresponding to the visual element; and
   provide the substitute web content information to the computing device.

14. The non-transitory computer-readable storage medium of claim 13, wherein the executable instructions further comprise instructions that, as a result of being executed by the one or more processors, cause the computer system to:

obtain information regarding the computing device indicating that the computing device is associated with automated agent activity, wherein the substitute web content information is generated in response to obtaining the information regarding the computing device.

15. The non-transitory computer-readable storage medium of claim 13, wherein the substitute web content information causes the computing device to process user interactions without detection by a user.

16. The non-transitory computer-readable storage medium of claim 13, wherein the substitute web content information causes the computing device to communicate with the computer system without detection by a user.

17. The non-transitory computer-readable storage medium of claim 16, wherein the substitute web content information includes instructions that cause the computing device to send interaction information regarding user interaction with the visual element based at least in part on detecting an interaction with the interaction area, and the instructions further comprise instructions that, as a result of being executed by the one or more processors, cause the computer system to:

generate, in response to receiving the interaction information regarding user interaction with the visual element, response information for causing the computing device displaying the substitute web content information to perform an action in response to the user interaction.

18. The non-transitory computer-readable storage medium of claim 13, wherein the substitute web content information causes the computing device to render one or more authentic resource objects of authentic web content on the webpage based on a user interaction with the visual element based at least in part on detecting an interaction with the interaction area, and the one or more authentic resource objects including corresponding interaction information for responding to a second user interaction.

19. The non-transitory computer-readable storage medium of claim 13, wherein the web resource is a second webpage, and the substitute web content information causes the computing device to render the second webpage based at least in part on detecting an interaction with the interaction area.

20. The non-transitory computer-readable storage medium of claim 13, further comprising:

generating, authentic web content information that, as a result of being processed by the computing device, causes an authentic resource object to be generated that includes interaction information for accessing the webpage, wherein generating the substitute web content information is in response to user interaction with the authentic resource object.

* * * * *